US008804760B2

(12) United States Patent
Sandstrom

(10) Patent No.: US 8,804,760 B2
(45) Date of Patent: Aug. 12, 2014

(54) NETWORK DATA TRANSPORT MULTIPLEXER BUS WITH GLOBAL AND LOCAL OPTIMIZATION OF CAPACITY ALLOCATION

(76) Inventor: Mark Henrik Sandstrom, Calgary (CA)

( * ) Notice: Subject to any disclaimer, the term of this patent is extended or adjusted under 35 U.S.C. 154(b) by 1189 days.

(21) Appl. No.: 12/363,667

(22) Filed: Jan. 30, 2009

(65) Prior Publication Data
US 2009/0310486 A1    Dec. 17, 2009

Related U.S. Application Data

(60) Provisional application No. 61/096,726, filed on Sep. 12, 2008, provisional application No. 61/075,108, filed on Jun. 24, 2008, provisional application No. 61/060,905, filed on Jun. 12, 2008.

(51) Int. Cl.
| | |
|---|---|
| *H04L 12/28* | (2006.01) |
| *H04J 3/16* | (2006.01) |
| *H04J 1/00* | (2006.01) |
| *H04L 12/54* | (2013.01) |
| *H04L 12/56* | (2006.01) |

(52) U.S. Cl.
CPC .......... *H04L 47/525* (2013.01); *H04L 12/5693* (2013.01); *H04L 47/6255* (2013.01); *H04L 47/522* (2013.01)
USPC ............................ 370/468; 370/403; 370/489

(58) Field of Classification Search
None
See application file for complete search history.

(56) References Cited

U.S. PATENT DOCUMENTS

| | | | |
|---|---|---|---|
| 5,315,596 | A | 5/1994 | Lee |
| 5,461,622 | A | 10/1995 | Bleickardt et al. |
| 5,506,712 | A | 4/1996 | Sasayama et al. |
| 5,526,349 | A | 6/1996 | Diaz et al. |
| 5,646,758 | A | 7/1997 | Miki et al. |
| 5,719,858 | A | 2/1998 | Moore |
| 6,097,733 | A | 8/2000 | Basu et al. |
| 6,411,410 | B1 | 6/2002 | Wright et al. |
| 6,574,222 | B1 | 6/2003 | Medhat et al. |
| 6,667,990 | B1 | 12/2003 | Arao |
| 6,674,714 | B1 | 1/2004 | Mochizuki et al. |
| 6,782,007 | B1 | 8/2004 | Redman |
| 6,807,186 | B2 | 10/2004 | Dally et al. |
| 6,883,084 | B1 | 4/2005 | Donohoe |
| 6,961,343 | B1 | 11/2005 | Yamazaki |
| 6,975,649 | B1 | 12/2005 | Roberts et al. |

(Continued)

OTHER PUBLICATIONS

PCT International Search Report and Written Opinion, PCT Application No. PCT/US2009/043508, Oct. 26, 2009, 9 pages.

(Continued)

*Primary Examiner* — Jutai Kao

(57) ABSTRACT

Systems and methods enable maximizing network data throughput via optimizing network capacity allocation. The network throughput maximization system comprises a network transporting data from source nodes to a destination node of the network, buffers for buffering data bytes to be sent from the source nodes to the destination node, and distributed algorithms performed by the destination and source node that cyclically optimize allocation of the network capacity among the source nodes according to the amounts of data bytes written in the buffers at the source nodes. The network data transport capacity allocation optimization method comprises steps of buffering at network source nodes data bytes to be transported to a network destination node, and cyclically optimizing by the destination and source nodes the data transport capacity allocation among the source nodes based on the relative volumes of bytes written in the source node buffers associated with the destination node.

25 Claims, 8 Drawing Sheets

(56) References Cited

U.S. PATENT DOCUMENTS

| | | |
|---|---|---|
| 7,072,361 B1 | 7/2006 | Player |
| 7,075,944 B1 | 7/2006 | Takagi |
| 7,110,358 B1 | 9/2006 | Clinton et al. |
| 7,130,276 B2 | 10/2006 | Chen et al. |
| 7,193,968 B1 | 3/2007 | Kapoor et al. |
| 7,254,138 B2 | 8/2007 | Sandstrom |
| 7,333,511 B2 | 2/2008 | Sandstrom |
| 7,349,414 B2 | 3/2008 | Sandstrom |
| 2001/0038607 A1 | 11/2001 | Honda |
| 2002/0049608 A1 | 4/2002 | Hartsell et al. |
| 2002/0080446 A1 | 6/2002 | Derventzis et al. |
| 2003/0074430 A1 | 4/2003 | Gieseke et al. |
| 2003/0147411 A1 | 8/2003 | Goosman |
| 2003/0152114 A1 | 8/2003 | Sandstrom |
| 2004/0032856 A1 | 2/2004 | Sandstrom |
| 2004/0042495 A1* | 3/2004 | Sandstrom ............. 370/489 |
| 2004/0174891 A1 | 9/2004 | Sandstrom |
| 2005/0102529 A1 | 5/2005 | Buddhikot et al. |
| 2005/0152349 A1 | 7/2005 | Takeuchi et al. |
| 2005/0198247 A1 | 9/2005 | Perry et al. |
| 2005/0259571 A1 | 11/2005 | Battou |
| 2006/0161674 A1 | 7/2006 | Sun et al. |
| 2006/0198368 A1 | 9/2006 | Guichard et al. |
| 2006/0235996 A1* | 10/2006 | Wolde et al. ............. 709/238 |
| 2007/0083628 A1 | 4/2007 | Sandstrom |
| 2007/0156919 A1 | 7/2007 | Potti et al. |
| 2007/0239842 A1 | 10/2007 | Knowles et al. |
| 2007/0297350 A1 | 12/2007 | Eilam et al. |
| 2008/0037553 A1 | 2/2008 | Gilmartin et al. |
| 2008/0069007 A1 | 3/2008 | Vasseur et al. |
| 2008/0104247 A1 | 5/2008 | Venkatakrishnan et al. |
| 2008/0137674 A1 | 6/2008 | Sandstrom |

OTHER PUBLICATIONS

United States Office Action, U.S. Appl. No. 11/692,925, Jan. 5, 2010, 20 pages.

U.S. Appl. No. 11/692,925, filed Mar. 29, 2007 (copy not enclosed).

PCT International Search Report and Written Opinion, PCT/US07/83951, May 7, 2008, 8 pages.

PCT International Search Report and Written Opinion, PCT/US07/83829, Apr. 16, 2008, 8 pages.

PCT International Search Report and Written Opinion, PCT/US07/83829, May 2, 2008, 7 pages.

PCT International Search Report and Written Opinion, PCT/US07/83994, Apr. 2, 2006, 7 pages.

United States Office Action, U.S. Appl. No. 11/692,925, Nov. 23, 2009, 19 pages.

United States Office Action, U.S. Appl. No. 11/692,925, Jul. 9, 2009, 19 pages.

PCT International Search Report and Written Opinion, PCT Application No. PCT/US09/43507, Jul. 14, 2009, 9 pages.

\* cited by examiner

| bus capacity request (BCR) 30 | access ctrl tag (ACT) 31[0] | 31 [1] | ACT, 2nd-pass 32[0] | 32 [1] |

NETWORK DATA TRANSPORT MULTIPLEXER BUS WITH GLOBAL AND LOCAL OPTIMIZATION OF CAPACITY ALLOCATION

CROSS REFERENCE TO RELATED APPLICATIONS

This application claims the benefit of the following U.S. Provisional Applications, which are incorporated by reference in their entirety: [1] Application No. 61/096,726, filed Sep. 12, 2008; [2] Application No. 61/075,108, filed Jun. 24, 2008; and [3] Application No. 61/060,905, filed Jun. 12, 2008.

This application is also related to the following, each of which is incorporated by reference in its entirety: [4] U.S. Pat. No. 7,349,414, filed Aug. 24, 2001, entitled "A System and Method for Maximizing the Traffic Delivery Capacity of Packet Transport Networks via Real-time Traffic Pattern Based Optimization of Transport Capacity Allocation"; [5] U.S. application Ser. No. 10/170,260, filed Jun. 13, 2002, entitled "Input-controllable Dynamic Cross-connect"; [6] U.S. Pat. No. 7,254,138, filed Jul. 11, 2002, entitled "Transparent, Look-up-free Packet Forwarding Method for Optimizing Global Network Throughput Based on Real-time Route Status"; [7] U.S. Pat. No. 7,333,511, filed Aug. 29, 2002, entitled "Dynamically Channelizable Packet Transport Network"; [8] U.S. application Ser. No. 10/382,729, filed Mar. 7, 2003, entitled "Byte-Timeslot-Synchronous, Dynamically Switched Multi-Source-Node Data Transport Bus System"; [9] U.S. application Ser. No. 11/692,925, filed Mar. 29, 2007, entitled "Data Byte Load Based Network Byte-Timeslot Allocation."

BACKGROUND

The invention pertains generally to the field of communications network systems, and in particular to techniques for dynamically optimizing network capacity allocation based on data load variations across the network to maximize the network data throughput.

Certain acronyms used in this specification are defined below:
- ANI active node identifier
- ACT access control tag
- BAC bus access controller
- BCR bus capacity request
- BTS byte timeslot
- EOB end of bus (source node)
- HW hardware
- L1 ISO OSI model network protocol layer 1, i.e., the physical layer
- L2 ISO OSI model network protocol layer 2, i.e., the data link layer
- L3 ISO OSI model network protocol layer 3, i.e., the network layer
- SNI source node identifier
- SW software
- TS timeslot Conventional communications networks are limited to physical layer network connections that have non-adaptive capacities, such as standard Ethernet or SDH/SONET or WDM connections, i.e., connections whose bit rate, once provisioned, is constant until the network is re-provisioned to chance the connection capacity. However, re-provisioning conventional networks to change connection capacities is normally a slower process by orders of magnitude than what would be needed to keep the connection capacities optimized per their real-time data traffic load variations. Worse still, when conventional networks are re-provisioned, e.g., to change a connection capacity, the network capacity related to such re-provisioning would not be delivering any data during the re-provisioning process.

Thus, despite that a significant and rapidly growing amount of the communications traffic generating revenues for the network operators is packet-based, i.e., such that forms variable data loads to be transported over network connections, conventional networks rely on physical layer connections whose capacities are normally constant once provisioned for a given network application. With such conventional networks where the connection capacities do not adapt dynamically according to the real-time data load variations, providing minimum network data throughput guarantees among a set of network nodes requires over-provisioning the network, i.e., setting aside capacity ahead of time for all possible traffic load distribution scenarios, even though only one of such scenarios will take place at any given time.

These factors create a need for an innovation enabling networks in which physical layer connection capacities adapt automatically to optimize the allocation of the network capacity continuously and thereby maximize the network data throughput.

SUMMARY

Embodiments of the invention provide systems and methods for maximizing network data throughput by cyclically optimizing network capacity allocation according to relative quantities of data arrived, during a previous network capacity allocation cycle, at buffers at the network source nodes queuing data for future transport over the network to a network destination node associated with said buffers at the source nodes.

In one embodiment, a network throughput maximization system comprises a network transporting data from a set of source nodes to a destination node of the network. For each network capacity allocation cycle, counters at the source nodes monitor amounts of data written in buffers at their nodes queuing data to be transported to the destination node. An element at the destination node cyclically allocates the network data transport capacity among the set of source nodes, with the source nodes capable of reallocating and reassigning units of the network capacity, i.e. channels in the network, between themselves under rules defined for such local optimization, in order to achieve faster response of the network capacity allocation optimization process. This optimization of network data transport capacity allocation is performed, at least in part, according to relative volumes of data bytes written during a previous capacity allocation cycle into the source nodes buffers related to the network destination node.

In an embodiment of the invention, a network data transport capacity allocation optimization method involves monitoring at network source nodes the amounts of bytes of data packets that have arrived at the source nodes destined to a network destination node. The network destination node then cyclically globally optimizes the allocation of the network capacity among the network source nodes in view of the relative amounts of bytes received at all the source node buffers associated with the destination node during a previous network capacity allocation cycle, with the source nodes being able to reallocate and reassign channels within the network capacity between themselves, i.e., to override parts of the global network capacity allocation first done by the destination node according to their local optimization algorithms, in order to speed up the responsiveness of the network capacity allocation optimization process.

In an embodiment, a network data throughput maximization method involves globally optimizing network data transport capacity allocation by the destination node of a network, and locally optimizing same via readjusting the transport capacity allocation by the source nodes. This periodic method comprises a set of repeating sub-processes that include a process for receiving network data traffic at the destination node from a number of source nodes via a corresponding number of physical layer connections of variable capacities, a process for automatically adjusting the capacities of the source-node-specific connections by the destination node based at least in part on variations in data volumes associated with the connections from the source nodes to the destination node, and a process for readjusting the capacities of the physical layer connections by the source nodes.

BRIEF DESCRIPTION OF THE DRAWINGS

FIG. 3 presents a more detailed view of the row overhead field of FIG. 2, in accordance with an embodiment of the invention.

Figure 1:
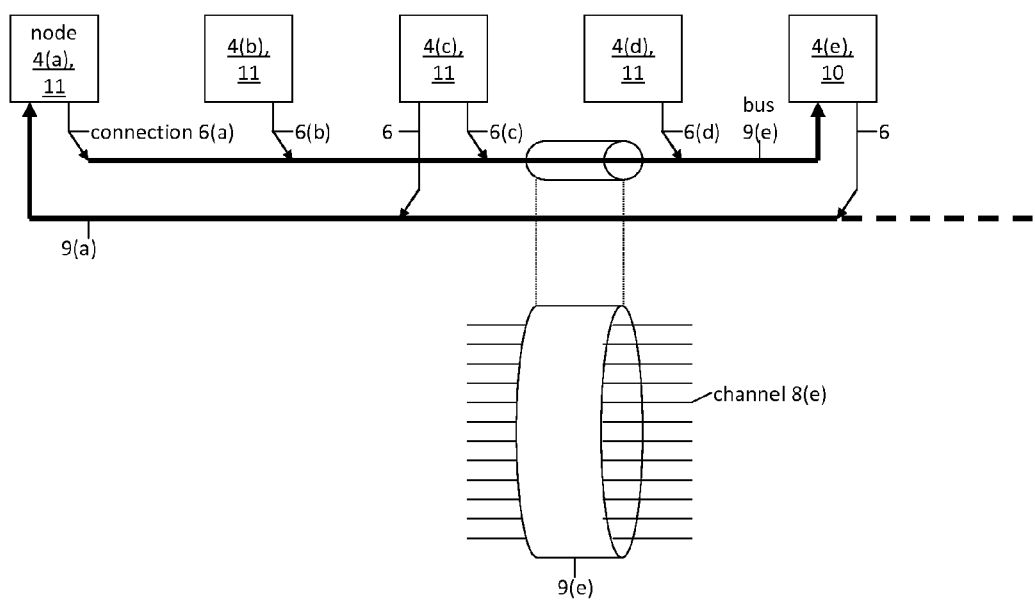
FIG. 1 shows an overview of a functional architecture of the network data throughput maximization system involving network buses that comprise a set of data transport channels, in accordance with an embodiment of the invention.

The following symbols and notations used in the drawings:
A box drawn with a dotted line indicates that the set of objects inside such a box form an object of higher abstraction level.
Arrows between boxes in the drawings represent a path of information flow, and can be implemented by any information transfer means available. Solid arrows indicate data flows, and gapped arrows control information flows.
Gapped segments of arrows indicate a possible continuation of the data path.
Lines or arrows crossing in the drawings are decoupled unless otherwise marked.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 presents, in accordance with an embodiment of the invention, a multi-source-node digital communications bus 9, formed of its member channels 8, in a communications network system, which forwards and transports data traffic among nodes 4. In this specification, data traffic or data refers to any form of digital data, including but not limited to digital video, digital voice and regular file transfer. In FIG. 1, the bus and channel instances under study, bus 9($e$) and channel 8($e$), are able to transport data from the bus source nodes 11 to the bus destination node 10, which are the same as the source and destination nodes, respectively, of the member channels 8 of the bus 9.

The buses 9 provide source node 11 to the destination node 10 L1 connections 6 whose capacities are cyclically optimized according to the data inflow volumes of the connections at their source nodes 11, by way of adjusting the number of bus channels 8 allocated for each source node specific connection 6 on a given bus 9 based on the variations in the relative amounts of bus capacity demanded by the source nodes of the bus. Various embodiments of the invented systems and methods can comprise any number of nodes 4, buses 9, etc. elements, as well as external interfaces to elements outside of the nodes 4. Also, for instance the bus 9($a$) can have source nodes and their respective connections 6 from nodes other than those shown in FIG. 1. Generally, the network system configuration of FIG. 1, including the presented quantities and connectivity between its elements, shall be understood just as an example used to illustrate features and operation of embodiments of the invention.

A channel 8 has a framed digital carrier, i.e., server signal, such as an SDH VC-3 aligned to an STM-N via an AU-3, and a source node 11 of the channel 8 is able to transmit data on the channel on a signal frame or a portion thereof, i.e., the source node is able to map data on at least a portion of the payload of the signal frame. Though the bus envelope 9 in FIG. 1 is drawn to be formed of twelve member channels 8, it shall be understood that a bus 9 can comprise any number of member channels, and in an embodiment of the invention each of the bus member channels 8 operate in alike manner described below with reference to FIGS. 2 through 6. In an embodiment, the individual member channels 8 of the bus 9 are time-slot-interleaved within their bus envelope 9, in which case the bus 9 is said to use time-division-multiplexing (TDM) and its member channels 8 occupy their respective timeslots (TSs) within such TDM bus 9. In case of SDH VC-n based channels and AU-n-Mc/STM-N carrier signal, the VC-n based channels 8 are the M TSs interleaved in the VC-n-Mc carrier envelope 9, where the parameter n denotes an SDH path signal level such as 11, 12, 2, 3 or 4 or concatenation thereof, N any valid SDH physical signal level such as 0, 1, 4, 16, 64, 256 etc., and integer M the number of member VC-n TSs, i.e., channels 8 in the VC-n-Mc concatenation group 9. In this specification, SDH STM-N, i.e., STM-0/1/4/16/64/256 etc. signals are used to denote also SONET STS-1/3/12/48/192/768 etc. signals, respectively.

In one embodiment, the carrier signal frames on the bus 9 are data structures made of a number of rows, each comprising a number of columns, wherein each column on a row is a byte timeslot (BTS) of the signal. At least one of the columns on each row of the signal frames is an overhead column BTS, forming the row overhead field, while the other columns are for payload BTSs, forming the row payload field. Moreover, the consecutive rows within the signal frames are structured similarly with respect to the row overhead and payload columns.

Figure 2:
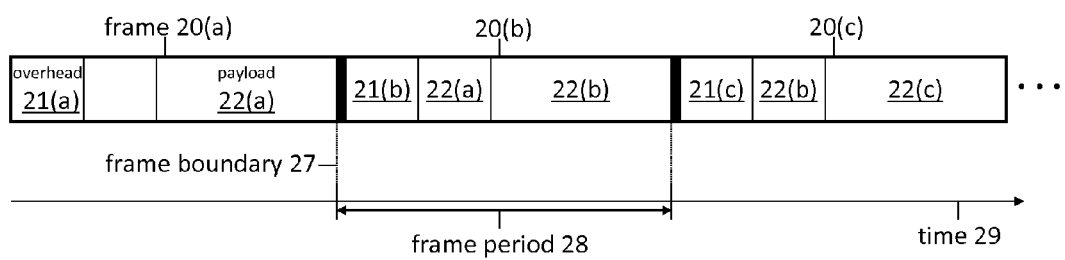
FIG. 2 presents a row-based signal framing structure on a channel of a network bus of FIG. 1, comprising row overhead and payload fields, in accordance with an embodiment of the invention.

FIG. 2 presents, in accordance with an embodiment of the invention, a sequence of signal rows 20 on a channel 8 of a bus 9 of FIG. 1, shown on a time axis 29, so that the signal data on the left end of the row sequence is transmitted and received the earliest. The signal rows in this context refer to any repeating, i.e., periodic blocks 20 of data fields, demarcated by row boundaries 27, on the channel signal. For example, in case that the channel uses SDH framing with client data carried on VC-3 payloads, such a periodic data block 20, referred to generally as a row 20 in this specification, can be a VC-3 row, which is repeated nine times per each VC-3 frame (and a VC-3 channel, mapped into e.g. SDH STM-N or SONET STS-N carrier signal, comprises a repeating sequence of such VC-3 frames). However, there exists several other type of embodiments for a row 20, e.g., SONET Virtual Tributaries. Thus, although, for the sake of clarity, a VC-3 row is consistently used in this specification as an embodiment of the signal row 20 of FIG. 2, the discussion related to signal rows applies to any sort of repeating block or field of data within a digital signal. The exemplary row period 28 for this specification, i.e. VC-3 row period, has the same nominal duration as that of an STM or STS row, i.e., one ninth of the 125 ms frame period.

The signal rows 20 of FIG. 2 have the following general characteristic:

Each row 20 occupies a period of time referred to as row cycle 28, which has a constant nominal duration defined in applicable signal protocol standard, and which are separated in time from each other by row boundaries 27, a representative of which is marked in FIG. 2 between rows 20(a) and 20(b). A representative of a row cycle 28 is marked in FIG. 2 on the time axis 29 for the signal row cycle occupied by row 20(b);

The rows 20 have a control information field 21, referred to as a row overhead;

The rows 20 include a payload information field 22, referred to as a row payload, associated with them.

In an embodiment, the row overhead 21 is carried in the channel signal within the same time block 28 as is the payload 22 of the row 20, which time block is referred to as signal row cycle 28. Note however that the row control information 21 can be located anywhere in time within the row cycle 28, and does not need to be one continuous field as it is shown, for clarity, within the rows 20 in FIG. 2. In an embodiment, in case of channels 8 using SDH VC-n framing, the row overhead 21 used for the channel control signaling described herein is the VC-n path overhead (POH) column, the row payload field 22 comprises the C-n payload columns of a VC-n row 20, and the row cycle 28 duration is nominally 125 ms divided by 9.

The payload field on a row cycle 28, when used for data transfer on a channel 8 from a source node 11 to the destination node 10 of the channel, provides one network capacity allocation unit on the bus 9, assigned to the source node 11. Accordingly, a single row cycle 28 on a multi-channel-bus 9 of M (an integer) member channel provides a total M network capacity allocation units to be allocated, in any division, among the individual source nodes 11 of the bus 9 for every new bus row cycle 28.

Per an embodiment of the invention, the row control information fields 21 carry bitfields referred to as channel Access Control Tags (ACTs), which are used to identify one of the source nodes 11 of a channel of a bus 9, e.g., channel 8(e) of bus 9(e) in FIG. 1, to transmit data on that channel 8(e) on a row cycle 28 associated with each ACT. The row cycle 28 associated with an ACT carried within the channel signal is defined in the applicable channel signal protocol specification, and a general principle is that the ACT is to precede in time the payload field 22 it is associated with. Accordingly, in an embodiment of the invention, the ACT carried within the control information field 21 of a row 20 whose payload field 22 it is associated with identifies the active source node 11 for that row payload field 22 on the channel signal. In such an embodiment, in FIG. 2 the control information field 21(a) of row 20(a) selects the active source node for mapping data on the payload field 22(a) of its row 20(a); the same way, 21(b) controls the transmission on 22(b), and so forth. Herein, the payload field 22(x) of a row 20(x) is defined as the payload field that begins during the same row cycle on which its associated control field 21(x) is located. Payload fields 22 can thus extend over a row cycle boundary 27 to the next row cycle. Also, there can be gaps, such as server signal overhead fields, between as well as within the rows 20 and their information fields 21 and 22, for instance when the signal is transmitted on a line, e.g., between nodes 4.

In an embodiment of a channel 8 such that uses SDH VC-3 frame structure of nine rows by 87 columns, comprising one POH column and 86 payload columns, the row control information field 21 can be carried in the first column of a VC-3 row, i.e., in the VC-3 POH column, and the row payload field 22 in the remaining columns in the C-3 payload of a VC-3 row. The payload field 22 can be mapped by an active channel source node 11 with any kind of client data of any protocol, as well as just raw data or idle bytes. The term byte is used in this specification to refer to a bit vector of any bit width (of at least one bit). While a common width of a byte is eight bits, in various embodiments a byte of data may comprise more or fewer then eight bits.

Figure 4:
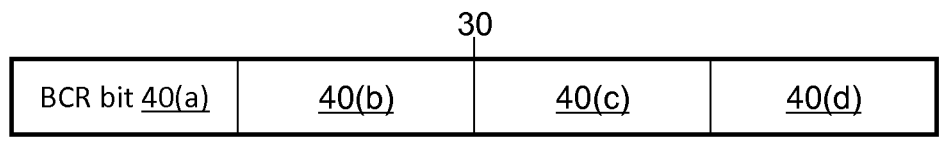
FIG. 4 presents in more detail a subfield of the row overhead field shown in FIG. 3, in accordance with an embodiment of the invention.

FIG. 3 depicts, in accordance with an embodiment of the invention, a more detailed internal bitfield structure for an embodiment of the row overhead field 21 shown in FIG. 2. The format of the bitfields of the row overhead field shown as examples in FIGS. 3 and 4 are such that enable mapping the row overhead field 21 of a channel 8 to a single BTS, e.g., to the VC-3 POH column of a VC-3 framed channel as discussed above.

The subfield 32 of the row control information field 21, comprising bits 32[0] and 32[1] in the embodiment presented in FIG. 3, carries the ACT from the upstream source nodes (starting from the furthermost, i.e., the End of Bus (EOB) source node) of the channel for the downstream source nodes 11 and the destination node 10 of the channel 8. In the bus 9(e) application example of FIG. 1, the ACT 32 identifies which one of the possible source nodes 11 for each channel 8(e), i.e., of nodes 4(a), 4(b), 4(c) and 4(d), is to map its data on the following row payload field 22 on that channel 8(e).

The subfields 31 of the row control information field 21 are for such a bus 9 source node 11, to which the destination node 10 of the bus is an end-of-bus source (EOB) node, to insert control information. (In FIG. 1, for instance node, node 4(a) is an EOB on the bus 9(e) to node 4(e).) In an embodiment of the invention studied herein in detail, the same bit format for ACT is used in both subfields 31 and 32.

That ACT format is such that it identifies the active source node, i.e., the node that is to transmit on the channel on the row payload 22 associated with the ACT 32, by expressing the number of source nodes 11 between the active node and the destination node, excluding both the active node and the destination node. That aforesaid value carried by ACT is referred to herein as the Active Node Identifier (ANI) for the row payload associated with the ACT. Similarly, for a given channel 8, all the source nodes 11 along it are configured with their respective Source Node Identifiers (SNIs) similarly expressing the number of intermediate channel source nodes 11 in between of each individual source node 11 and the destination node 10 of the channel. Thus, the source nodes 11 of the channel 8(*e*) in the example of FIG. 1 have their respective SNIs as follows:

| Source node: | SNI = ACT value that activates the node: |
|---|---|
| 4(*a*) | 3 |
| 4(*b*) | 2 |
| 4(*c*) | 1 |
| 4(*d*) | 0 |

Hence, an ACT of value 2 in a row overhead field 21 on channel 8(*e*) would identify the source node 4(*b*) to transmit data on the channel on the next row payload field 22, and similarly for the rest of the {source node, SNI (=activating ACT value)} pairs shown in the above table. Generally, the channel access control involves: monitoring, by the individual source nodes of a channel 8, the ACT 32 field within the row overhead fields 21 of each signal row 20 on the channel; and transmitting data on the channel 8, on the row payload field 22 associated with the given ACT, by that channel source node 11 whose SNI matched the ANI carried by the ACT.

SDH/SONET-based embodiment for signal framing, such as VC-3, provides a straightforward way to extend the herein discussed dynamic, row cycle switched channel functionality into a multi-channel-bus via TDM byte-timeslot interleaving. Thereby it is feasible to arrange a set of VC-3 channels in parallel to form a dynamic, row cycle switched data transport bus 9 for transport of data from the bus source nodes 11 to its destination node 10. Such a multi-channel bus 9 provides, besides a greater aggregate capacity than a single channel 8, also means for a more granular network bus capacity allocation among the source nodes 11 by enabling more than one, and even all, of the set of its source nodes 11 to transmit data on the same bus 9 to its destination node 10 concurrently, i.e., during the same row payload field 22, by way of allocating the member channels of the bus among multiple source nodes of the bus for a given row cycle. For instance, incase there were twelve VC-3 channels 8(*e*), with their channel order numbers #0 through #11, on the bus 9(*e*), on a given row cycle 28 on the bus, the source node 4(*a*) could be assigned the VC-3 channels #0, #1, #2 and #3, while node 4(*b*) could be assigned the channels #4, #5 and #6, 4(*c*) the channel #7 and #8, and 4(*d*) the rest, i.e., #9, #10 and #11. Enabled by this network capacity allocation optimization method of the invention, on the next VC-3 row cycle, i.e., on the next network capacity allocation period, the allocation of the channels among the source nodes 4(*a*) through 4(*d*) of that 12×VC-3 bus 9(*e*) can be completely different, as defined by the ACTs 32 carried in the control fields 21 of individual VC-3 channels 8 on the subsequent VC-3 row 20. Whatever the allocation of the member channels of a bus among its source nodes on any given row cycle 28, in an embodiment of the invention, the set of bus channels assigned to an individual source node, such as node 4(*c*) of bus 9(*e*) in FIG. 1, are concatenated to continuously form a single, logically un-channelized, connection 6, e.g., 6(*c*) from node 4(*c*)) to the destination node of the bus 9.

An efficient implementation of the above described dynamic, row cycle switched channel is achieved so that each source node 11 of a channel 8 transmits data on its channel using the same carrier signal frame and row cycle phase, so that the destination node receives on the channel a continuous sequence of valid, client-data-carrying rows 20 each of uniform nominal duration 28 specified by the channel server signal protocol.

For the EOB node, e.g., node 4(*a*) on the channel 8(*e*) in FIG. 1, this principle is met simply so that the EOB node transmits a continuous sequence of signal rows, with the payload fields 22 of exactly those rows 20 mapped with its client data that are identified as assigned to the EOB node by their associated ACTs 32 as these ACT bitfields are transmitted from the EOB source node downstream on the bus 9.

The other source nodes 11, referred to as downstream source nodes, on the channel continuously keep track of the current row phase on the channel using a row BTS counter that is once per carrier signal frame period synchronized to the current frame phase on the channel signal as received from upstream channel, i.e., on the channel from the direction of its EOB node. Since the frames consist of similarly repeating rows 28, such as the nine 87-byte rows of a VC-3 frame, the frame phase synchronization also provides row phase synchronization for the source nodes of a channel. With such upstream-channel frame and row phase synchronized BTS counter, a downstream node along the channel 8 is able to locate and capture the channel-specific ACTs 32 on each row 20, as well as insert its own control information in its related subfields (e.g., 31 and 30) on each row transmitted on the downstream channel, and, incase the ACT matched with the SNI of the source node, map the row payload field 22 associated with the ACT with its client data to be transported to the destination node 10 of the channel 8. In case of a VC-3 channel, the above described upstream-channel row-phase synchronized channel access process involves performing the SDH standard functions related to accessing the S3 data layer, i.e., VC-3 channel carried within an STM-N carrier signal, including STM-N frame boundary detection and AU-n pointer processing to locate the VC-3 frame and row boundaries 27 and VC-3 POH 21 and C-3 row payload 22 BTSs.

Furthermore, an efficient implementation for a multi-channel bus 9 formed of the above described BTS-synchronously accessed, parallel multi-source-node channels 8, is achieved so that all member channels of the bus have the same common frame and row phase when received by any of the downstream source nodes 11 or the bus destination node 10, so that the row cycles 28, and thus row boundaries 27, coincide throughout all channels 8 of the bus 9. In an embodiment of the invention, this principle is upheld via arranging all the member VC-3 channels 8 of the bus 9 to be member VC-3 TSs of a single VC-3-Mc concatenation group, which is aligned to its carrier STM-N signal via a single AU-3-Mc pointer, thus ensuring that all member VC-3s of the VC-3-Mc bus stay in the same row BTS phase (based on that the row BTS phase of a VC-3 is defined by the frame phase of its STM-N server signal and the offset of the AU pointer with which the VC-3 is aligned to its STM-N). Hence, in an embodiment of the invention, the channels 8 are VC-3 TSs within a single VC-3-Mc bus 9 transmitted by the EOB node of the bus comprising M (any integer greater than zero) VC-3 TS channels in total. Note, that since the downstream nodes of such a VC-3-Mc bus insert data only on their assigned VC-3 TSs on that bus and pass-through the other TSs, the AU-3-Mc (including its pointer bytes, which are regenerated at each node according to standard SDH pointer processing) flow through all the way to the destination node of the bus, so that the destination node will continuously receive a regular SDH VC-3-Mc signal on the bus with a continuous AU-3-Mc pointer from frame to frame, regardless of which source node mapped data on which VC-3 TS channel 8 of the VC-3-Mc bus 9 on any given row payload field 22.

Since the rows 20 on their channels 8 of the bus 9 identify, via their channel specific ACTs carried via subfields 32, to which source node specific connection 6 the payload field 22 belongs to on any given row cycle 28 on the bus 9, each source node connection associated receiver instance at the bus destination node 10 knows which VC-3 TSs on the VC-3-Mc bus 9 belongs to its associated connection 6 on each row cycle on the bus. Such a source node connection associated receiver instance provides a SDH-to-packet demapper function in case of packet-based client traffic carried on its associated connection 6.

Bitfield 31 in FIG. 2, comprising in this embodiment of bits 31[0] and 31[1], is used for carrying an ACT for a channel 8 on which the node 4 generating the ACT is the destination node 10. As an example, in the network of FIG. 1, the destination node 4(*e*) of a channel 8(*e*), inserts the ACTs controlling access for the channel 8(*e*) on the bitfields 31 of the overhead fields 21 on another channel 8 on the bus 9(*a*), which delivers the ACTs to the EOB node 4(*a*) of the bus 9(*e*) channel 8(*e*). The EOB node 4(*a*) of the channel 8(*e*) then loops back those ACTs via bitfields 32 within the row overhead fields 21 on that channel, for which those ACTs identify the active source nodes for their respective row payload fields 22.

FIG. 4 presents the internal structure of subfield 30 of the channel signal row control field 21 shown in FIG. 3, in accordance with an embodiment of the invention.

In an embodiment of the invention studied herein in detail that uses VC-3 based channel 8 signal framing, and wherein the bus 9 capacity allocation unit is one VC-3 row payload worth of BTSs, the bitfield 30 is used to carry capacity request information, in units of VC-3 TSs 8 for a one VC-3 row cycle 28, by the source node inserting it for the bus 9 on which the bitfield 30 travels on. In an embodiment of a VC-3-Mc bus 9 formed of M (an integer) VC-3 TS-channels 8, a bus source node 11(*x*) sets its associated bits 40(*x*) of the bitfields 30 on as many of the M VC-3 TS-channels 8 on the bus as is its current Bus Capacity Request (BCR) in units of VC-3 TSs for its connection 6 to the bus destination node 10. An embodiment of a bus source node 11 computes the magnitude of its BCR figure, i.e., its requested number of channel units on the bus, based on its amount of data bytes written, during the preceding row cycle 28, into buffers storing data for future delivery on the bus 9 toward its destination node 10. For instance, assuming the source node 4(*b*) of the bus 9(*e*) in FIG. 1 had received, during the most recent VC-3 row cycle before it inserted its associated bits 40(*b*) on the channels 8(*e*) of the bus 9(*e*), such an amount of data bytes toward the node 4(*e*) that would demand for its connection 6(*b*) on the bus 9(*e*) four VC-3 rows worth of capacity, it would set the bit 40(*b*) on the VC-3 channels #0, #1, #2, and #3 to the active value, and leave the bit 40(*b*) to inactive value on the rest of the VC-3 channels #4-#11 on the VC-3-12c bus 9(*e*).

The bitfield format of row control information field 21 described herein in reference to FIGS. 3 and 4, comprising eighth bits, in an embodiment of the invention can be carried in the POH column BTS of a VC-3 frame structured channel 8. Such an embodiment of the invention described herein does not use any of the L1 (SDH) signal payload capacity for control signaling, but instead allows using all the L1 payload capacity for carrying actual client data, e.g., L2 packets. In applications of the invention where more bits per a row control information field would be needed, it is possible for instance to add one VC-3 payload column to extend the row control information field, still with relatively insignificant increase in the signal overhead percentage.

Figure 5:
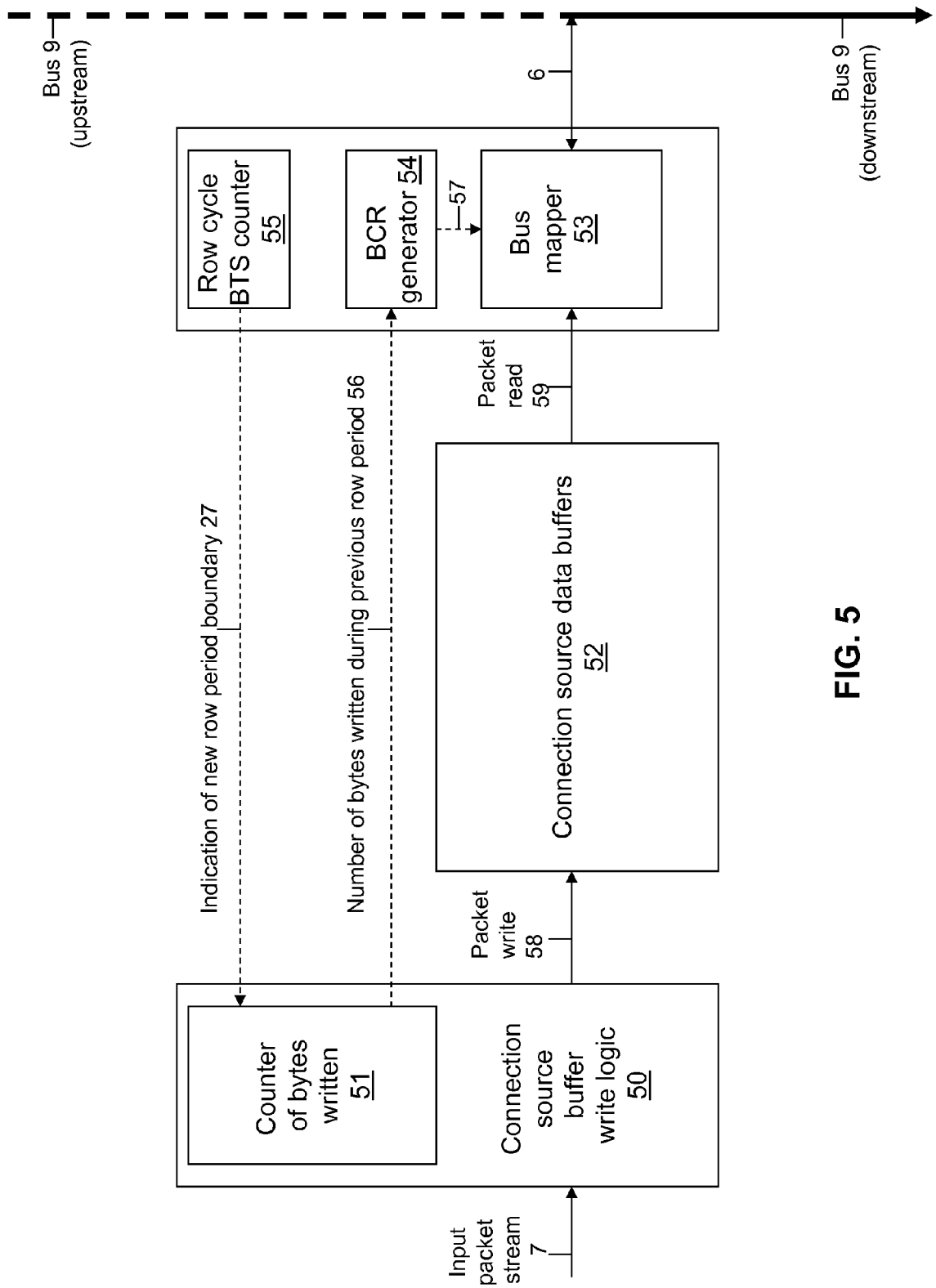
FIG. 5 illustrates an architecture of a source node functionality in the network per FIG. 1, in accordance with an embodiment of the invention.

FIG. 5 presents a block diagram of a source node 11 functionality, including the Bus Capacity Requests (BCR) generation, in a network per FIG. 1, in accordance with an embodiment of the invention.

In an embodiment of the invention, the BCRs are computed for each source-destination node connection 6 individually, once for each new row cycle 28, by converting the number of data bytes (B) 56 written 58 by a connection source buffer write logic 50 during the previous row cycle to the connection source buffer 52 feeding the connection 6, from the source node 11 to the destination node 10 of the bus 9, into a corresponding number X (=0,1, . . . ,M) of VC-3 timeslot channels 8 whose combined byte transfer capacity during a VC-3 row cycle approximate the data byte inflow B for the connection 6. In the example logic block diagram of FIG. 5, the byte inflow B per each bus row cycle, i.e., during each consecutive network capacity allocation cycle 28 is monitored by a connection source buffer byte write counter logic 51. The connection 6 byte inflow counter 51 gets its row cycle boundary notification 27 from a row BTS counter 55 that operates in the bus 9 server signal frame and row phase, causing the amount of data bytes written for the associated connection source buffers to be sampled and recorded for each successive bus capacity allocation cycle.

In a possible embodiment providing a straightforward logic implementation, the BCR 57 of a source node, i.e., the number M of VC-3 TSs the source node requests for its connection 6 on the bus for the next VC-3 row cycle, can be computed using the formula:

$$\text{If } B > 0, BCR = MIN\{ M, MAX\{ 1, INT(B/64) \} \};$$
$$\text{Else } BCR = 0,$$

where M is the total number of VC-3 TSs on the VC-3-Mc bus 9. This formula is straightforward to implement in hardware logic BCR generator 54, as dividing B by number 64 can be done simply by truncating the six least significant bits away from the binary representation of B.

Since in the embodiment of the invention studied herein in detail the bus 9 capacity allocation unit is a VC-3 row, which provides 86 payload bytes, a more accurate BCR generation algorithm is such where the byte inflow B associated with a connection 6 is divided by value 86. A possible hardware implementation of the division of B by 86 is provided by a look up table based logic that provides for each potential value of BCR={0, 1, 2, . . . M} a pre-computed a range of their corresponding values for B. A specification for such a look up table, assuming a VC-3-Mc bus 9 of twelve VC-3s, i.e., M=12, is provided via below table:

| B (bytes received during a row cycle): | BCR (VC-3 TSs requested for a row cycle): |
|---|---|
| 0 | 0 |
| 1 . . . 129 | 1 |
| 130 . . . 215 | 2 |
| 216 . . . 301 | 3 |
| 302 . . . 387 | 4 |
| 388 . . . 473 | 5 |
| 474 . . . 559 | 6 |
| 560 . . . 645 | 7 |
| 646 . . . 731 | 8 |
| 732 . . . 817 | 9 |
| 818 . . . 903 | 10 |
| 904 . . . 989 | 11 |
| 990 or higher | 12 |

In an embodiment of the invention, the combined data inflow figures for each of the buffers 52, which buffer data bytes queued for future transport to the destination node associated with the buffers and from which the bus mapper 53 reads 59 data to its associated bus 9, are used in forming the value of the data byte inflow B 56, based on which the value of the BCR 57 for that bus is computed by the BCR generator 54. The data bytes written 58 into the connection source buffers 52 can be received by the source node 11 from different interfaces of it, including from an access interface 7 over which the source node receives data from external systems, e.g., from an external L2 or L3 node, or from another bus 9.

Embodiments of the invention can use also additional factors, besides the volume of the data byte inflow (B) during the previous bus capacity allocation cycle per above, in forming the value of their BCRs. Such possible additional factors can include, for example, the amount of data bytes queued at the source node buffers from which the bus mapper 53 maps data to its associated bus 9, as well as the priority levels of the connection data inflow or the buffered data.

The benefits of having each source node of a bus 9 to request bus capacity for each new bus capacity allocation cycle, i.e., the row cycle 28, based on the actual number of bytes of data destined toward the bus destination node 9 that had arrived at each given source node during the previous row cycle 28 include that over time the source nodes request as much bus capacity as they have received data bytes to map on that bus (on the row payload fields 22 assigned to them by the bus destination node based on the BCRs).

Figure 6:
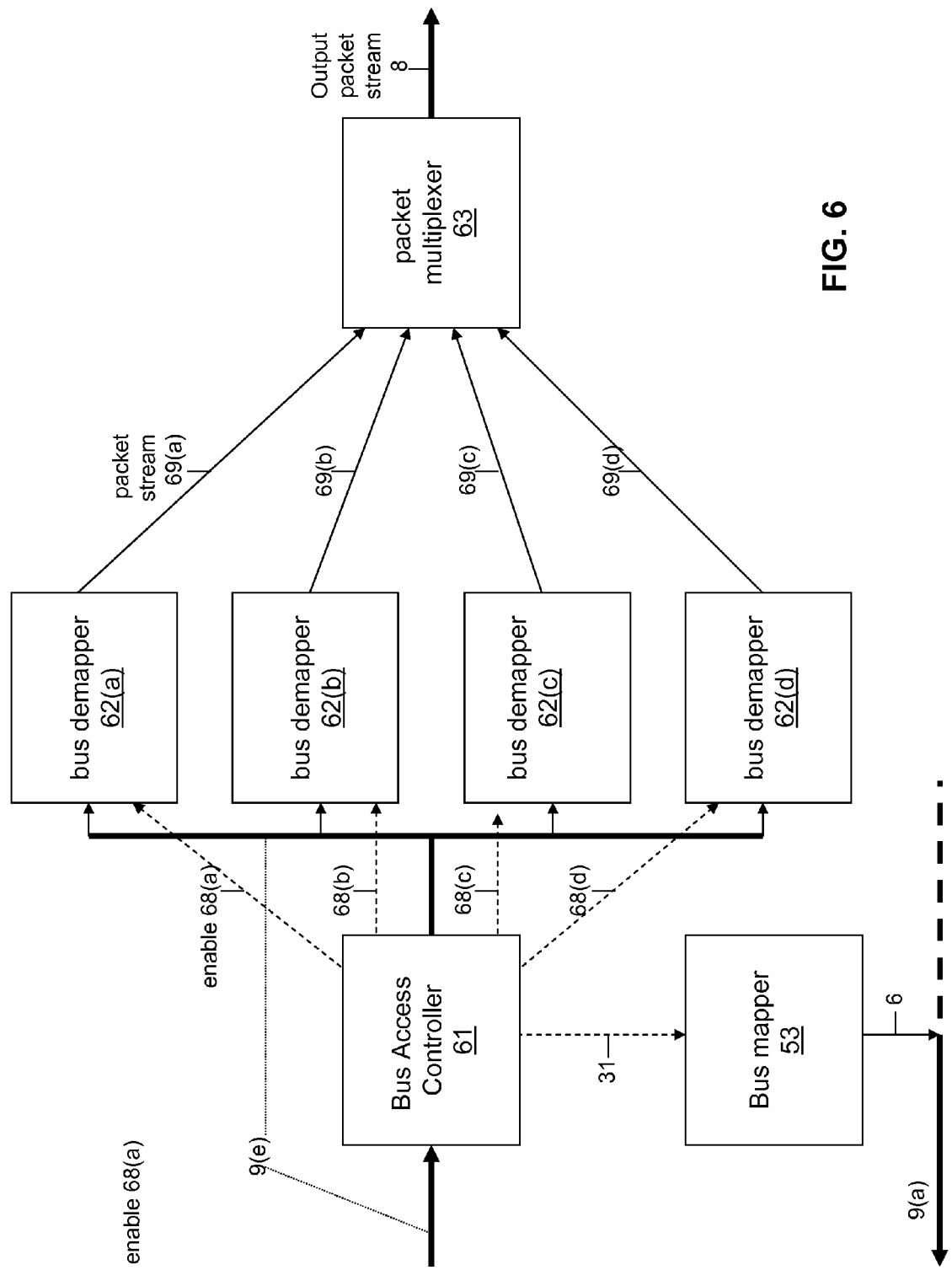
FIG. 6 illustrates an architecture of a destination node functionality in the network per FIG. 1, in accordance with an embodiment of the invention.

FIG. 6 presents a block diagram of a destination node functionality, in accordance with an embodiment of the invention. At its destination node 10, the bus 9 is received by a module referred to as the Bus Access Controller (BAC) 61. The BAC periodically, for each new row cycle 28 on its bus 9, performs a bus channel 8 allocation optimization among its source nodes 11, assigning the channels of the bus between the source node specific connections 6 for a future bus capacity allocation cycle, based on the most recent set of BCRs it has received on the bus 9 from its source nodes on the source node associated bits 40 of subfields 30 (FIGS. 3 and 4). The network capacity allocation optimization method of the invention is employed in order to continuously to maximize the rate of client data delivered by a network bus 9, and the capacity optimization algorithms performed by the destination node, in view of the BCRs from all the source nodes in parallel, is referred to herein as global bus capacity allocation optimization. This allocation and assignment of bus channels 8 among its source nodes 11 produces a set of bus channel 8 specific ACTs, each of which carries an ANI 32 identifying one of the bus source nodes 11 to map data on its associated row payload field 22 on the bus channel 8 that a given ACT travels on.

In the network example of FIG. 1, the BAC 61 at the destination node 10(e) of the channel 9(e) sends the set of ACTs (using one of its local bus mappers 53) on subfield 31 of row overhead fields 21 on the bus 9(a) (on which that host node 4(e) of the BAC is a source node 11) to the bus 9(a) destination node 4(a), which is the bus 9(e) EOB node. That EOB node 4(a) of bus 9(e) will then loop the set of ACTs via subfields 32 back on the bus 9(e). All source nodes 4(a) through 4(d) process and apply the set of ACTs on the bus 9(e) (as described herein in references to FIGS. 3, 5, 6, 7 and 8), i.e., transmit data on the payload fields 22 associated with such ACTs 32 that carry an ANI that match their respective SNIs as the ACT bitfields are transmitted downstream on the bus from each source node.

In addition to the BAC 61 performing capacity allocation for a bus 9 to which its host node 10 is the destination, in an embodiment of the invention per FIG. 6, at the destination node 10 of a bus 9 there is a set of bus source node (e.g., 4(a) through 4(d) per FIG. 1) specific packet demappers 62(a) through 62(d) that recover the packet streams from their associated connections 6(a) through 6(d). Moreover, in an embodiment of the invention based on an SDH framed bus 9, the packet demappers recover from the VC-n frames their respective L2 packet sequences 69 for further processing by downstream logic 63.

As described in the foregoing regarding FIG. 3, the channel 8 specific ACTs 32 on the row control fields 21 of each row 20 on the bus 9 identify to which source node specific connection 6 their associated row payload field 21 belongs to. Based on the ACTs on most recently received row control fields 21, i.e., VC-3 POH bytes in the embodiment studied in detail herein, the BAC 61 at the bus destination node 10 thus knows which VC-3 TS channels 8 on the VC-3-Mc bus 9 belongs to which source node 11 specific connection 6 on each new payload field 22 on the bus 9. Accordingly, the BAC 61 enables the correct source node specific packet demapper 62 to receive data bytes on the bus 9 on each bus byte timeslot. That way, each of the demappers 62(a), 62(b), 62(c) and 64(d) per FIG. 6 receives a data byte sequence from the bus 9 that form the original data packet sequence 69(a), 69(b), 69(c), or 69(d) sent by its related source node 4(a), 4(b), 4(c) or 4(d), respectively, on their corresponding connection 6(a), 6(b), 6(c) or 6(d) on the bus 9(e) to its destination node 4(e). An embodiment of the invention depicted in FIG. 6 further provides a packet multiplexer 63 that multiplexes data packets from the source node specific packet streams 69(a) through 69(d) into a combined packet stream 8 that can be sent over an external network interface for instance to another packet-switching or processing network element, or to another node 4 based on this specification.

Figure 7:
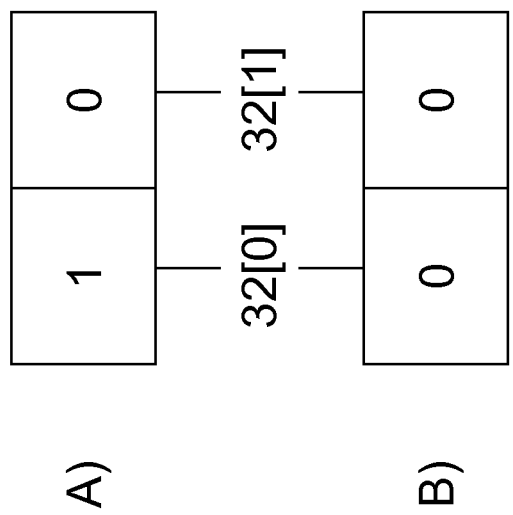
FIG. 7 illustrates an aspect of an embodiment of the invention where a source node in a network, such as the network shown in FIG. 1, reallocates its surplus units of network capacity to downstream source nodes.

FIG. 7 illustrates an aspect of the invention, using the network per FIG. 1 as an example, where logic at a bus mapper 53 at a source node 4(a) through 4(c) reallocates and reassigns its local surplus units of network capacity to its downstream source nodes 4(b) through 4(d) along the bus 9(e). FIGS. 7.A and 7.B, respectively, present a possible scenario of binary values of ACTs 32 before and after reallocation of a channel 8 from one source node 11 to another one downstream from it along a bus 9. Note that since local optimization algorithms performed by the source nodes 11, described herein in reference to FIGS. 7 and 8, result both in reallocation of channels (i.e. changes to the bus capacity allocation) as well as reassignment of channels (i.e. determination of the new source node for a reallocated channel), these local optimization actions are herein referred to just as reassignment for simplicity, though also reallocation of channel capacity between the source nodes is included with them.

In accordance with an embodiment of the invention, a source node 11, such that has one or more source nodes between itself and the destination node along the bus 9 under study, reassigns from itself a maximum number (if any) of the channel 8 resources that were marked as assigned to it to its next downstream source node along the bus 9 such that after said reassignment the remaining number of channels assigned to the source node performing the reassignment still meets the amount of channel resources demanded by the most recent BCR figure of that node for the given bus under study.

For instance, if the ACTs received by a given source node assigned for that node six channels, but the latest BCR figure of the node only required four channels (i.e. the node had data in its related queue to utilize only 4 channel rows worth of the bus capacity), and the node in question has at least one node along the bus under study between itself and the destination of the bus, such a source node reassigns its surplus of 6−4=2 of the channels initially assigned to it to its next downstream source node. In an embodiment, these local surplus channels being reassigned are the channels with the highest channel order numbers among the channels assigned to the node performing the reassignment by the ACTs received by said node. The node carries out such reassignment of channels by overwriting the ACT bits 32 of such surplus channels with the ACT field value that is one less than its own SNI value.

FIG. 7 presents an example, situated for the network of FIG. 1, of a case of the source node 4(c) reassigning one of its originally assigned channels on the bus 9(e) to its next downstream source node 4(d), by rewriting the value in the received ACT bit field 32 of such a channel, i.e., overwriting decimal value 1 (shown in FIG. 7.A as binary 01) with a new value decimal 0 (shown in FIG. 7.B as binary 00) that is one less than its own SNI, which ACT value activates its next downstream node that in the case for source node 4(c) is the node 4(d). Note that FIGS. 7 and 8 depict the case of using big-endian encoding for ACT value transmission.

As an even more specific example scenario, if the node 4(c) was assigned via the ACTs it receives six of the twelve channels on bus 9(e), specifically channels with order numbers of 3 through 8, but its most recent BCR figure for that bus demanded only four channels, the node 4(c) rewrites the ACT bit fields 32 for the channels numbers 7 and 8 with decimal value 0 in the signal that it transmits downstream on the bus 9(e), and accordingly does not map its data on the payload fields associated with these overwritten ACTs. Consequently, the node 4(d) receives the ACTs of these reassigned channel with ACT values that match its SNI i.e. values that activate it to map data on the upcoming bus payload field 22 on those channels, as well as the other channels assigned to it. The destination node, despite any reassignment of local surplus channels among the source nodes along the bus, thus also gets the valid source-node to channel resource mapping info via ACTs that it receives on the bus.

Figure 8:
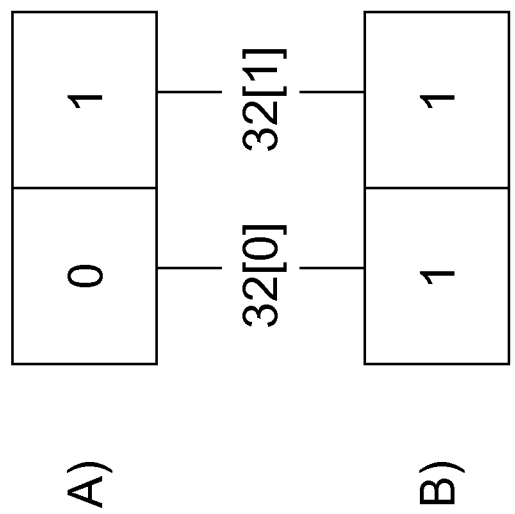
FIG. 8 illustrates an aspect of an embodiment of the invention where a source node in a network, such as the network shown in FIG. 1, reallocates to itself units of network capacity initially allocated to downstream source nodes, in order to match its demand of network capacity up to a level of fair division of network capacity among the source nodes.

FIG. 8 illustrates an aspect of the invention, using the network of FIG. 1 as an example, where logic at a bus mapper 53 at a source node reassigns to itself units of network capacity initially assigned to its downstream source nodes to match its demand up to its fair share of the bus capacity, in a case when the source node had been allocated less that its fair share of bus capacity while its most recent BCR to the destination node demanded more channels on the bus that it had been allocated. FIGS. 8.A and 8.B, respectively, present a possible scenario of binary values of ACTs 32 before and after reallocation of a channel 8 by a source node 11 to itself from another one source node 11 downstream from it along a bus 9.

In an embodiment of an invention, the fair share of bus 9 capacity for each of its source node 11 is equal to the lesser of i) total number of bus channel resources divided by the number of source nodes on the bus and ii) the data mapping capacity of a given source node on the bus, in units of bus transport channel 8 resources. In other embodiments, the fair share of bus capacity can be individually configured for each source node along a given bus; however the sum of the source node specific fair shares of capacity along any given bus should match the total amount of channels on the bus.

In accordance with an embodiment of the invention, a source node 11, such that has at least one source node between itself and the destination node along the bus 9 under study, reassigns to itself a minimum sufficient number of channels (if any) that that meets the lesser of its latest BCR or its fair share of channels on the bus, however within the limits of the number of channels to be reassigned i.e. channels assigned to source nodes downstream from it on the bus.

For instance, if the ACTs allocated for a given node two channels, but the latest BCR figure of the node demanded four channels (i.e. the node had data in its related queue to utilize four channel rows worth of the bus capacity) while the fair share of the bus capacity for the node was three channels, and said node has at least one node along the bus under study between itself and the destination of the bus, such source node reassigns to itself its deficit worth of the channels initially allocated to its downstream source node, i.e., in the case of present example, reassigns to itself 3−2=1 channel, assuming at least one such channel to be reassigned existed. In an embodiment, these local deficit channels being reassigned are the channels with the lowest channel order numbers among the channels that were assigned to the downstream node(s) before the reassignment discussed herein. The node carries out such reassignment of channels by overwriting the ACT bits 32 of the channels being reassigned with the ACT field value equal to its own SNI value.

FIG. 8 presents an example, situated for the network of FIG. 1 and in accordance to the above described scenario of local deficit, the act of the source node 4(a) reassigning to itself one of the channels originally assigned on the bus 9(e) to its next downstream source node 4(b), by rewriting the value in the received ACT bit field 32 for that channel, i.e., by overwriting decimal value 2 (shown in FIG. 8.A as binary 10) to a new value decimal 3 (shown in FIG. 8.B as binary 11) that is its own SNI as the ACT for the reassigned channel is transmitted from node 4(a) downstream on the bus. (Note that FIGS. 7 and 8 depict the case of using big-endian encoding for ACT value transmission.) The source node 4(a) accordingly also maps data on the channel payload field 22 that it reassigned to itself, along with other channels assigned to its via the ACTs that it received for that bus cycle, and correspondingly, the node 4(b) knows from the rewritten ACT for the reassigned channel to not map its data on its associated payload field 22 but to simply pass its through down the bus.

As an even more specific example scenario, if the node 4(a) was allocated via the ACTs that it receives two of the twelve channels on bus 9(e), specifically channels with order number of 0 and 1, but its most recent BCR figure for that bus demanded four channels while its fair share is three channels of the bus capacity, the node 4(a) rewrites the ACT bit field 32 for the channel number 2 with decimal value 3 (equal to its SNI) in the signal that it transmits downstream on the bus 9(e). Consequently, the node 4(b) receives the ACT of this reassigned channel with ACT value that does not match its SNI (of decimal value 2), causing the node 4(b) to treat the channel as being already used by one of its upstream nodes on the bus.

Since the bus destination nodes 10 monitor the ACT 32 values received on the buses for determining which channels make up the connection 6 from which source node, regardless of any surplus and/or deficit based reassignment of channels among the source nodes 11 along the buses, the destinations of the buses thereby automatically get correct source-node to channel resource 8 mapping info via the ACT signaling received on the bus 9 for every bus row cycle 28.

In an embodiment of the invention, the source nodes use the BCR value that they use for encoding the bitfield 30 transmissions on the bus as the latest BCR figure for determining whether they have local surplus or deficit of channels allocated on the bus, and for a basis for consequent reassignments per FIGS. 7 and 8 and related descriptions. In an embodiment, the source nodes also rewrite the bitfields 32 in connection with such reassignments in similar manner as they transmit their BCR figures encoded in bitfields 30.

Bus capacity allocation and channel 8 realignment processes by the source nodes 11 along a bus 9 according to the principles above in references to FIGS. 7 and 8 achieve local optimization of bus capacity allocation, as techniques additional to the global i.e. entire bus-scope optimization of network capacity allocation performed by the destination node 10 of each bus. These local optimization techniques achieve accelerated capacity allocation response by networks based on buses 9 to variations of data traffic volumes between the nodes 4 via enabling the capacity allocation of a bus 9 to be readjusted also during the bus capacity allocation cycle between the successive global optimization algorithm runs at the destination node of each bus, thereby providing maximized data traffic throughput of networks utilizing buses 9.

Regarding FIGS. 1 through 8, it is noted that all of the nodes 4 may include both source and destination node functionalities.

Moreover, regarding FIGS. 1 through 8 and related descriptions herein, it shall be understood that the functional elements (drawn as boxes), such as the modules labeled as 'bus access controller (BAC) 61' and 'bus mapper 53', are presented as distinct modules for the purpose of clarity of the illustration of the invented systems and methods. However, in various embodiments, any one of the discussed functions, such as the network bus 9 scope global capacity allocation optimization by BAC, or the capacity reallocation based local optimization by bus mappers, can be implemented either by their respective discrete logical modules (e.g. as illustrated in the examples of FIGS. 5 and 6), by a combination of a number of functional modules, or as embedded with other functions. For instance, in one embodiment, the local optimization i.e. capacity allocation readjustments (functions discussed in connection with FIGS. 7 and 8) by bus source nodes could be performed at each source node by a logical module separate from the module performing the bus 9 data mapping, and in some embodiments, such capacity reallocation module could furthermore be combined with a general control module performing the global capacity allocation optimizations for other buses. Similarly, in certain embodiments, functions related to the herein presented module BAC can be separated into various other modules, and those logical functions can be implemented for instance combined with the modules performing the demapping of data (illustrated in FIG. 6 as elements 62) from the buses 9. Naturally, in various embodiments, elements performing the functions presented herein in connection with FIGS. 1 through 8 can be also named differently, while still utilizing the invented systems and methods.

System Architecture and Operating Principles

Embodiments of the present invention include an efficient communications network architecture based on physical layer i.e. L1 connections whose capacities are automatically and continuously optimized according to their input data flow variations.

Per the discussion in the foregoing regarding the drawings, embodiments of the invention perform traffic-load-adaptive optimization of communications network capacity allocation, thereby maximizing data throughput of a communications network based on real-time data traffic load variations across the network, such as the example network system of FIG. 1. Such a network system comprises a data transport layer, called data plane, implemented with buses 9, and a control plane, implementation of which involves in an embodiment of the invention a logic module called Bus Access Controller (BAC) that is located at the destination node 10 of each bus 9 and that performs the global optimization phase of dynamic channel 8 allocation algorithms for buses 9. Embodiments of the network data and control planes are described in following.

Data Plane

One embodiment of the invention provides a byte-timeslot-synchronous, non-overhead-adding and data-loss-free data transport channel 8 based on a novel channel-access-control signaling mechanism enabling dynamic signal row (e.g., VC-3 row) cycle synchronous switching. Using the invention, multiple, potentially geographically distant and independently clocked source nodes 11 can map data on the same communication channel 8 so that a different source node can map data on the channel on every new row cycle 28 on the channel. With the invention, switching between the old and new active source nodes on the bus takes place on a definite column on each row cycle 28 on the channel.

In an embodiment of the invention, the dynamic row cycle switched multi-source-node channel 8 operates so that the furthermost source node on the channel, called the end-of-bus source (EOB) node, continuously sends server signal frames, comprising repeating sequences of rows, on the bus with a pointer identifying the BTS location of the first byte of each channel frame sent. The EOB source signals, via the overhead field 21 of each row 20 of the signal frames, to which one, potentially itself, of the source nodes of the channel the next row payload field 22 on the channel is assigned to. A source node of the channel maps its data on the channel on exactly those row payload fields which are marked as assigned to it by the value of an active source node identifier carried in the preceding row overhead field as these overhead fields are transmitted from each given source node downstream on the bus. The row cycle herein can be any repeating block 20 of data on the channel signal that comprises the row overhead 21 and row payload 22 BTSs. For instance, a VC-3 row of BTSs fills that definition in case of a VC-3 framed channel 8.

Control Plane

In an embodiment of the invention, on every row cycle 28, the BAC 61 adds together the Bus Capacity Request (BCR) bits 40 that are set in their active values in the source node 11(*x*) associated bits field 40(*x*) within the row control information fields 21 on each channel 8 of the bus 9, to gather the BCR figures, an integer number of requested channels, for each individual bus source node. The BAC then runs its global optimization algorithms to allocate and assign the bus channels 8 among the set of bus source nodes 11 once every bus row cycle 28 based on the most resent BCRs received from its bus source nodes, in one embodiment of the invention, according to the following algorithm:

1.) BAC allocates the member channels 8 of the bus 9 among the individual source node specific connections 6 so that it assigns channels, one channel at a time, per each source node whose BCR figure exceeds the number of channels so far assigned to it, until either all channels of the bus are allocated, or until the BCR of each source node is fulfilled, whichever comes first.

2.) Following 1.), the BAC initially assigns any remaining unallocated channels to the EOB source node of the bus, allowing the EOB source to reassign its local surplus channel resources to its next downstream source node, and so on by the source nodes down the bus, thus enabling the source nodes to perform their local optimization of the bus capacity allocation during the bus capacity allocation cycle on the bus, according to FIGS. 7 and 8 and related descriptions.

This method of globally optimizing network bus capacity allocation produces a channel order number indexed table containing a set of Active Node Identifiers (ANIs) identifying the active source node per each bus channel 8 for a new row cycle 28 on the bus 9. The method thus causes the capacities of the source node specific physical layer connections 6 on the bus 9 to be automatically adjusted periodically, once per each consecutive bus capacity allocation cycle 29, based on the volumes of data inflows for the connections 6 on a preceding capacity allocation cycle.

Moreover, as illustrated via FIGS. 7 and 8 and related descriptions, the bus source nodes 11 may perform local optimization of bus 9 capacity allocation, by readjusting the initial, global bus channel allocation by the destination node 10, based on their local channel surplus or deficit amounts, in order to achieve faster responsiveness of the bus capacity allocation optimization process in particular for cases of longer transmission distance based delays in the source-destination-source node control loop. For every new row cycle 28, BAC 61 distributes the channel 8 specific ANIs, i.e., bus Access Control Tags (ACTs), through its local bus mapper 53 accessing another bus 9, to the furthest most source node, i.e., EOB node of the bus to which the local node 4 of the BAC in question is the destination, using bus row control overhead field 31 based signaling. That EOB source node of the bus 9 under study then loops back the ACTs via bus row control overhead field 32, thereby signaling the active source node identification per each bus channel 8 for the bus source and destination nodes for each new row cycle 28 on the bus 9. The execution of ACTs 32 at the source 11 and destination 10 nodes, including the reassignment of the channels 8 between the source nodes 11 along the bus 9 according to the FIGS. 7 and 8 and related descriptions in the foregoing, concludes the bus control-plane process cycle.

The use of the bus row overhead 21 subfields 30, 31 and 32 is described in detail in the foregoing regarding the drawings, in particular FIGS. 3 through 8.

Reference Material

The referenced patent publications [1] through [9] provide additional context as well as efficient implementation techniques related to the invention described in this specification. In particular, [1] provides specifications for a reference network system utilizing aspects of the present invention. Moreover, [5] describes an efficient dynamic multiplexing scheme, and [2], [3] and [6] efficient packet forwarding and dynamic route optimization schemes that can be used for related system implementations. The references [4], [7], [8] and [9] provide further context and network application examples related to the invention described in this specification.

Conclusions

This detailed description describes various embodiments of the present invention for application examples discussed in the foregoing. Specific application, architectural and logic implementation examples are provided in this and the referenced patent applications for the purpose illustrating particular implementations or embodiments of the invention. Naturally, there are multiple alternative ways to implement or use, in whole or in part, the principles of the invention as set forth in the foregoing. For instance, while this detailed description uses consistently VC-3 row as the reference embodiment of the dynamic switching, i.e., network capacity allocation unit, mapping the concept of the invented dynamic switching method for various other potential embodiments of a digital communications channel, including but not limited to SONET STS-1/3c/12c/48c/192/768c, VT-1.5/2/6 or SDH VC-11/12/2/3/4(-Mc) (M is an integer) signals, will be understood by those skilled in the art in view of this specification. Generally, those skilled in the art will be able to develop different versions and various modifications of the described embodiments, which, although not necessarily each explicitly described herein individually, use the principles of the present invention, and are thus included within its spirit and scope. It is thus intended that the specification and examples be considered not in a restrictive sense, but as exemplary only, with a true scope of the invention being indicated by the following claims.

What is claimed is:

1. A system for maximizing network data throughput, the system comprising:
    a network configured to transport data from a set of source nodes to a destination node, the network having a network capacity;
    at the source nodes, counters for monitoring an amount of data written, during consecutive capacity allocation cycles, into one or more buffers queuing data to be sent from their corresponding source node to the destination node;
    at the destination node, a bus access controller for allocating the network capacity among the source nodes, for a future capacity allocation cycle, at least in part based on the amounts of data written into the buffers at the source nodes during a previous capacity allocation cycle, wherein the allocating produces a global capacity allocation among the source nodes for the future capacity allocation cycle; and
    at one or more of the set of source nodes, a bus mapper for reallocating units of the network capacity, wherein the reallocating alters the global capacity allocation among the source nodes for the future capacity allocation cycle, and wherein the reallocating for the future capacity allocation cycle is performed subsequently to the allocating for that same future capacity allocation cycle.

2. The system of claim 1, wherein the bus mapper associated with a source node is configured to reallocate units of the network capacity, referred to as channels, by reassigning one or more of the channels from its associated source node to one or more source nodes that are located downstream from said source node toward the destination node.

3. The system of claim 2, wherein the bus mapper is configured to reassign channels incase that the source node received a surplus allocation of the network capacity.

4. The system of claim 2, wherein the bus mapper is configured to reassign a maximum number of the channels that were assigned to its associated source node to the next downstream source node, wherein, after the reassignment, the remaining number of channels assigned to its associated source node meets an amount of channels determined to satisfy the demand for the network capacity of the source node performing the reassignment.

5. The system of claim 1, wherein the bus mapper associated with a source node is configured to reallocate the units of network capacity, referred to as channels, by reassigning one or more of the channels to its associated source node from one or more source nodes that are located downstream from said source node toward the destination node.

6. The system of claim 5, wherein the bus mapper is configured to reassign channels incase that the source node received a deficit allocation of the network capacity.

7. The system of claim 5, wherein the bus mapper is configured to reassign to its associated source node a number of channels that were assigned to one or more downstream source nodes, wherein the number of reassigned channels is a function of its associated source node's demand for the network capacity.

8. The system of claim 7, wherein after the channels are reassigned, the total number of channels assigned to the source node associated with the bus mapper matches said source node's demand for the network capacity up to that source node's fair share of the network capacity, wherein the fair share of network capacity for the source node is the lesser of: (i) the total number of channels on the network divided by the total number of nodes within the set of source nodes, and (ii) the maximum data mapping capacity of said source node on the network in units of channels on the network.

9. The system of claim 1, wherein the bus mapper is configured to reallocate the network capacity by overwriting control fields associated with reallocated units of the network capacity as the control fields are transmitted downstream on the network.

10. The system of claim 1, wherein the bus mapper is configured to signal the reallocation of units of the network capacity to its downstream source nodes on the network, if any, and to the destination node.

11. The system of claim 10, wherein the bus mapper is configured to signal the reallocation of units of the network capacity to its downstream source nodes on the network, if any, and to the destination node, using control fields associated with the reallocated capacity allocation units as the control fields are transmitted downstream on the network.

12. The system of claim 1, wherein a total amount of the network capacity allocated to a source node forms a single Layer 1 connection from that source node to the destination node.

13. A method for optimizing network data transport capacity allocation in a network configured to transport data from a set of source nodes to a destination node, the network having a network capacity, the method comprising:
at the source nodes, monitoring amounts of data destined to the destination node that arrived at the source nodes during successive capacity allocation cycles;
at the destination node, allocating the network capacity among the source nodes, for a future capacity allocation cycle, based at least in part on the amounts of data that arrived at the source nodes during a previous capacity allocation cycle, wherein the allocating produces a global capacity allocation among the source nodes for the future capacity allocation cycle; and
at one or more of the set of source nodes, reallocating the network capacity, wherein the reallocating alters the global capacity allocation among the source nodes for the future capacity allocation cycle, and wherein the reallocating for the future capacity allocation cycle is performed subsequently to the allocating for that same future capacity allocation cycle.

14. The method of claim 13, wherein the reallocating of the network capacity, comprising a plurality of channels, is performed by a source node by reassigning from itself one or more of the channels to one or more source nodes that are located downstream from said source node toward the destination node.

15. The method of claim 14, wherein the source node reallocating the network capacity is configured to reassign channels incase that it received a surplus allocation of the network capacity.

16. The method of claim 13, wherein the reallocating of the network capacity, comprising a plurality of channels, is performed by a given source node by reassigning to itself one or more of the channels from one or more source nodes that are located downstream from the given source node toward the destination node.

17. The method of claim 16, wherein the source node reallocating the network capacity is configured to reassign channels incase that it received a surplus allocation of the network capacity.

18. The method of claim 13, wherein the network capacity is allocated among the source nodes cyclically for each capacity allocation cycle.

19. The method of claim 13, wherein the capacity allocation cycle has a duration based on an SDH STM row period or SONET STS row period.

20. A method for maximizing network data throughput via globally optimizing network capacity allocation by a destination node of a network and locally optimizing same by a plurality of source nodes, the method comprising a set of sub-processes including:
receiving network data traffic by the destination node from the plurality of source nodes via a corresponding plurality of physical layer connections, each physical layer connection having a variable capacity;
automatically adjusting the capacities of the physical layer connections by the destination node based at least in part on variations in volumes of data byte inflows associated with the physical layer connections from the source nodes to the destination node, wherein the adjusting produces a global capacity allocation among the source nodes for a future capacity allocation cycle; and
readjusting the capacities of a plurality of the physical layer connections by at least one of the source nodes, wherein the readjusting alters the global capacity allocation among the source nodes for the future capacity allocation cycle, and wherein the readjusting for the future capacity allocation cycle is performed subsequently to the adjusting for that same future capacity allocation cycle.

21. The method of claim 20, wherein the readjusting comprises reassigning one or more channels of the capacity of the physical layer connection from the source node that is performing the readjusting to one or more other source nodes that are located downstream toward the destination node of the network.

22. The method of claim 20, wherein the readjusting comprises reassigning one or more channels of the capacities of the physical layer connections to the source node that is performing the readjusting from one or more other source nodes that are located downstream toward the destination node of the network.

23. The method of claim 20, wherein at least one of the sub-processes is performed periodically with a regular process period duration.

24. The method of claim 23, wherein the regular process period duration of a sub-process is based on a duration of a carrier signal frame period on the network.

25. The method of claim 20, wherein each one of the set of sub-processes is performed periodically.

* * * * *